United States Patent Office.

GEORGE H. REISTER, OF WASHINGTON, IOWA.

Letters Patent No. 91,867, dated June 29, 1869; antedated June 15, 1869.

IMPROVEMENT IN SEED-SOWER.

The Schedule referred to in these Letters Patent and making part of the same.

*To all whom it may concern:*

Be it known that I, GEORGE H. REISTER, of Washington, in the State of Iowa, have invented a certain new and useful Improvement on Seed-Sowers; and I do hereby declare that the following is a full, clear, and exact description of the construction and operation of the same, reference being had to the accompanying drawings, and to the letters and marks thereon, which said drawings form part of this specification, and, by the several figures thereof, represent a sower constructed under my invention—

Figure 1 being a side view of such sower;

Figure 2, a top view; and

Figures 3 and 4, views of the seed-box or distributer.

In each of these figures, where like parts are shown, like marks and letters are used to indicate the parts.

The seed-box $a$ is affixed to the front bar $b$, the side arms $c$ of which are pivoted to the side-frame bars $d$.

Within the box is a three-winged shaft, $e$, rotated by an endless chain or band, $f$, which passes around the pulley $g$, and the toothed cylinder $h$.

The bottom plate $i$ is toothed on its inner edge, as shown by fig. 4, over which fits a plain plate, $j$, that, by any suitable means, attached to the knob $k$, and, actuated by any of the rotative parts of the sower, may be moved in and out, to allow the seed to drop down between the spaces of the teeth.

The means for operating this plate $j$ may be made adjustable, so that the plate may be moved more or less frequently, or to a greater or less distance, to adapt the feeding or delivering of the seed from the box, as may be required for large or small seed, or for large or small quantities.

Underneath, and attached to a projection, $l$, from the front bar $b$, are the axle $m$ and guide-wheels $n$.

Behind the seed-box is the toothed cylinder $h$, the shaft $o$ of which serves to pivot the arms $c$ to the bars $d$, as also to hold the fulcrum-plate $p$ of the lever $q$.

This toothed cylinder $h$ may be raised or lowered, to adapt it to use or non-use, by the levers $q$, which have a fulcrum at $r$, are connected to the arm $c$ at $s$, and are united by the rear cross-bar $t$.

A tooth, $u$, on the bar $t$, and an upright toothed plate or bar, $v$, attached to the rear frame-bar $w$, serve to hold the levers in their adjusted position.

The two conditions of use and non-use of the toothed cylinder, and the respective parts connected therewith, are shown by fig. 1 of the drawings, the first being indicated by black, and the last by the red lines or markings.

Behind the toothed cylinder are the clearing-fingers $x$, extending forward from the cross-bar $y$, to which their rear ends are affixed, and between this cross-bar $y$ and the rear bar $w$ are the rollers $z$, the shaft $z'$ of which has suitable bearings on or in the frame-bars $d$.

While these rollers act as the pressing or smoothing-rollers to the soil, and seed sown therein, they also act as the power-rollers to the operative parts of the sower, the endless chain or band $y'$ communicating the motion to the toothed cylinder, as indicated by fig. 2.

The rollers $z$, though on the same shaft, move independently of each other, which enables the sower to travel more readily over stones or irregular surfaces of the soil.

From this description of the construction of the sower, it will readily be seen how the operation of sowing, covering the seed, and pressing the soil and the seed therein, may be performed by it.

The arrangement of the means for elevating and lowering the toothed-cylinder, is of the character of a toggle-joint, a very easy and effective arrangement for quick movement and stability, while the manner of using the shaft of this cylinder, for connecting the bars and levers, is both cheap and durable.

What I claim as my invention, and desire to secure by Letters Patent, is—

1. The arrangement of the seed-box, toothed cylinder, clearing-fingers, and divided rollers, as herein set forth.

2. The arrangement of the levers $q$, bars $d$, and arms $c$, in their relation to each other, and to the toothed cylinder, as herein recited.

3. The forming of the joint of the ends of the arm $c$ and bar $d$, and supporting the fulcrum-plate $p$ by the shaft of the toothed cylinder, as described.

This specification signed, this 11th day of September, 1868.

GEO. H. REISTER.

Witnesses:
M. M. SHEARER,
GEORGE W. MARSDEN.

G. H. Reister,
Wind Wheel.
No. 91,868. Patented June 29, 1869.
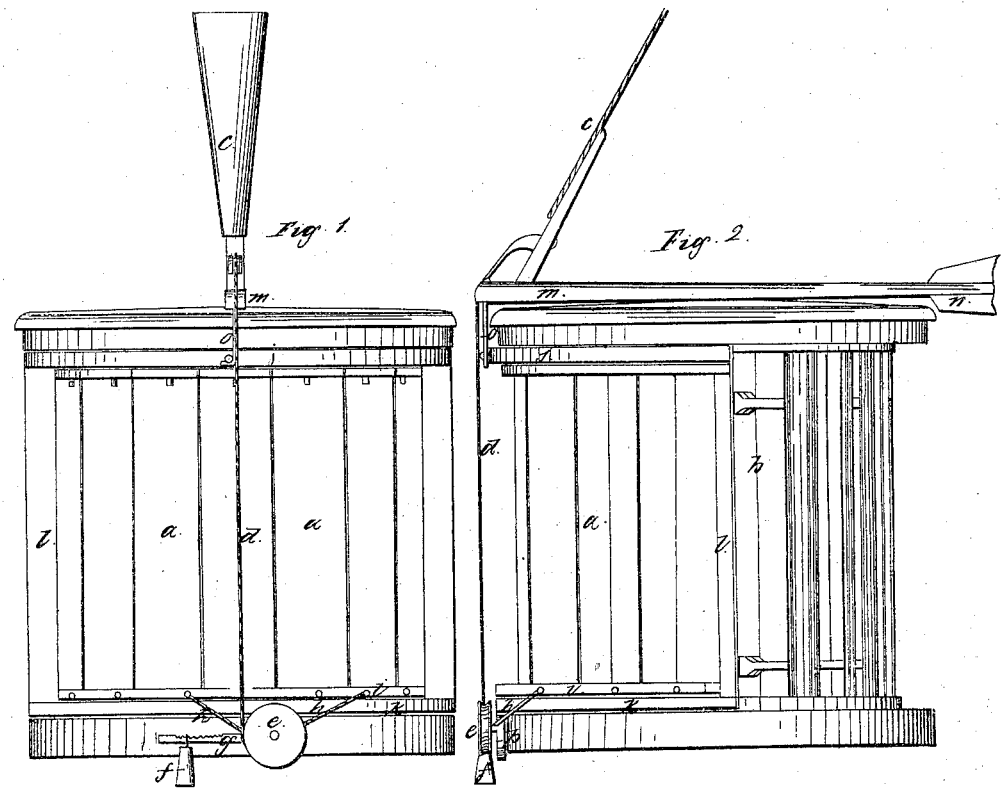
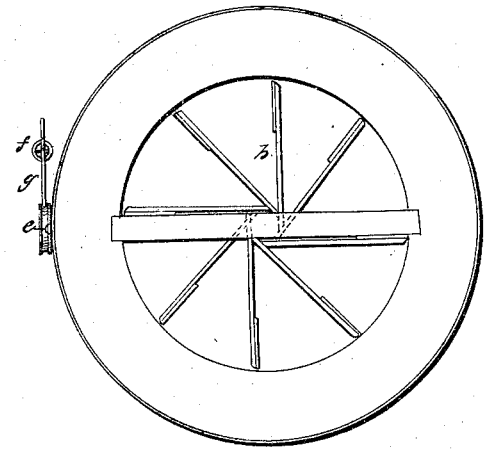
Witnesses:
T. Smith
E. E. Jones
Inventor:
Geo. H. Reister
by atty T. P. Everett